United States Patent [19]
Ohkoshi et al.

[11] Patent Number: 4,727,284
[45] Date of Patent: Feb. 23, 1988

[54] LIGHT SOURCE DISPLAY FOR A LARGE PICTURE SCREEN

[75] Inventors: Akio Ohkoshi; Hideaki Nakagawa, both of Tokyo; Koji Tsuruta, Kanagawa; Kunio Shikakura, Tokyo, all of Japan

[73] Assignee: Sony Corporation, Tokyo, Japan

[21] Appl. No.: 804,089

[22] Filed: Dec. 3, 1985

[30] Foreign Application Priority Data

Dec. 4, 1984 [JP] Japan .................................. 59-256357

[51] Int. Cl.$^4$ ........................ H01J 19/34; H01J 19/46; H01J 19/54; H01J 29/32
[52] U.S. Cl. ..................... 313/497; 313/495; 313/491; 313/493
[58] Field of Search ............... 313/495, 496, 497, 491, 313/492, 493, 414

[56] References Cited

U.S. PATENT DOCUMENTS 4,100,455  7/1978  DuBois .............................. 313/496

FOREIGN PATENT DOCUMENTS 208057  12/1982  Japan .................................. 313/495
 16457   1/1983  Japan .................................. 313/495

Primary Examiner—Leo H. Boudreau
Assistant Examiner—K. Wieder

[57] ABSTRACT

A luminescent display tube wherein a plurality of luminescent trios and a plurality of electrode units corresponding thereto are disposed opposite to each other in a single housing, and a member forming an enclosure of each electrode unit functions also as an accelerating electrode. The invention realizes a high-luminance display tube or display cell of a small-sized structure which incorporates a plurality of luminescent trios serving as picture elements and electrode units corresponding thereto. Consequently, it becomes possible to construct a large-picture display apparatus of moderate dimensions by arraying a multiplicity of such display cells. Furthermore, a plurality of wire cathodes and first grids as well as a common second grid are grouped into an electrode unit with its enclosure functioning as the second grid, and such electrode units are arrayed correspondingly to individual luminescent trios, thereby facilitating assembly and manufacture of a desired display cell. In the electrode units constituting the display cell, each of the first grids is positioned and set by an insulator substrate and a pair of insulator walls in each unit, without any other means such as spot welding, so that the electrode unit can be produced in a sufficiently small structure, hence ensuring remarkable facility in assembly and manufacture of such small-sized display cell.

10 Claims, 30 Drawing Figures

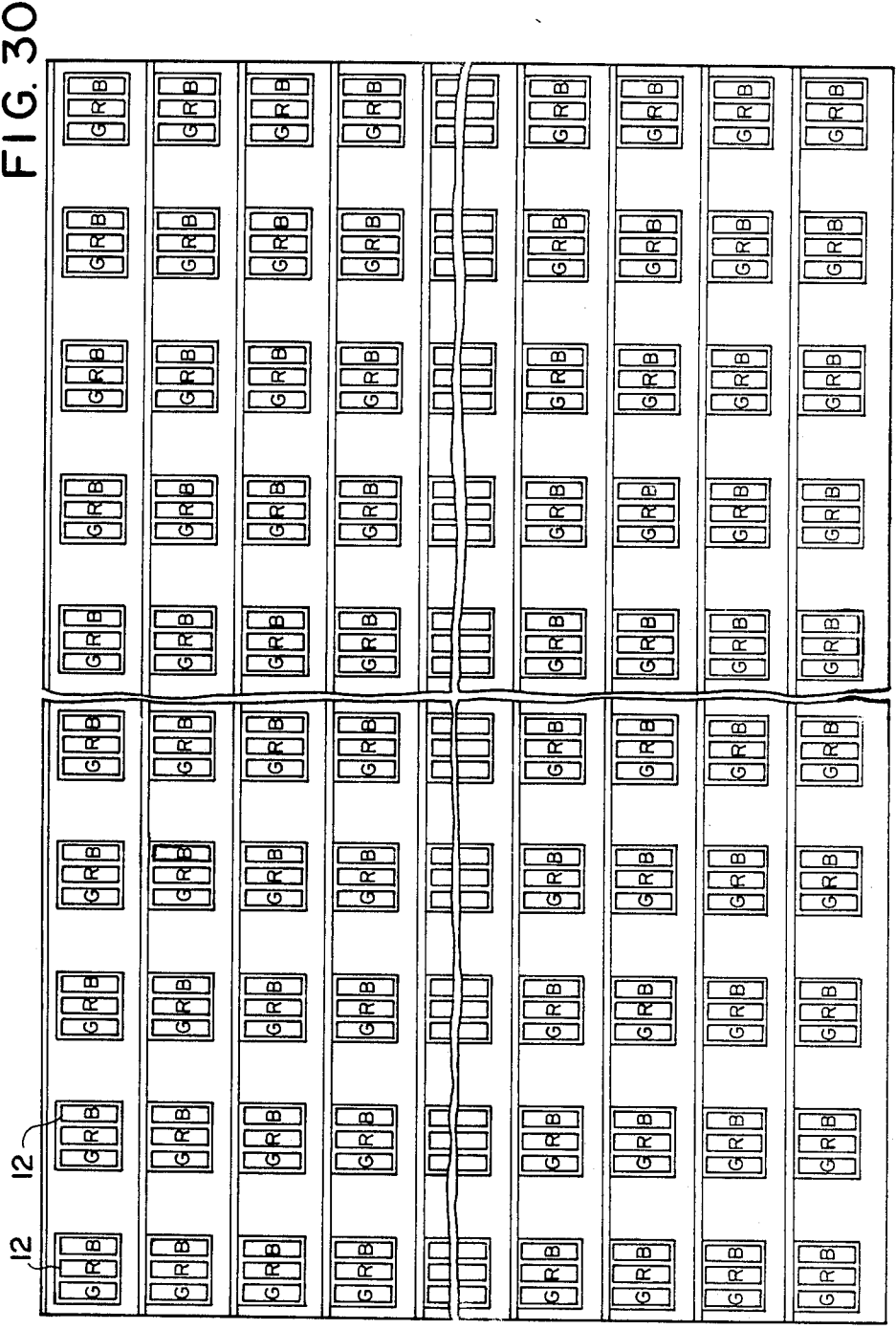

LIGHT SOURCE DISPLAY FOR A LARGE PICTURE SCREEN

CROSS-REFERENCE TO RELATED APPLICATION

This application discloses an improvement on the cell disclosed in copending application, Ser. No. 635,608, filed July 30, 1984.

BACKGROUND OF THE INVENTION

1. Field of the Invention

The present invention relates to highly luminescent display cells.

2. Description of the Prior Art

A large-sized display apparatus has been proposed which consists of a multiplicity of luminescent display cells, each cell having luminescent trios composed of three phosphor layers which emit red, green and blue light, so as to produce a large-picture screen, for example, 40 meters wide by 25 meters high.

As illustrated in FIGS. 28 and 29, such a luminescent display cell is constructed so that the three phosphor layers 2 (2R, 2G, 2B) for emission of red, green and blue light are formed by coating the inner surface of a front panel 1A of a glass housing 1. The phosphor layers are surrounded with a dark layer 3, for example, carbon. Furthermore, the three wire cathodes K ($K_R$, $K_G$, $K_B$), three first grids (control electrodes) $G_1$ ($G_{1R}$, $G_{1G}$, $G_{1B}$) and a common second grid (accelerating electrode) G2 are disposed opposite to the three-color phosphor layers 2R, 2G and 2B, respectively.

The phosphor layers 2R, 2G and 2B are surrounded with a separator 4, and electron beams from the wire cathodes K radiates toward or directed to the corresponding phosphor layers 2 individually. An anode terminal 5 for applying an anode voltage to the phosphor layers 2 extends out from the glass housing 1 via the separator 4 from between the front panel 1A and the sidewall plate 1C. The terminals 6 for the cathodes K, first grids G1 and second grid G2 extend from the housing between the rear panel 1B and the sidewall plate 1C. In this luminescent display cell, an anode voltage is applied to the phosphor layer 2 through the anode terminal 5, and the voltage between the anode and the second grid G2 is fixed and the phosphor layers selectively activated with regard to the on-off state in accordance with the voltage applied to the first grid G1.

The display apparatus employing such luminescent display cells is advantageous in the capability of producing a huge picture, but there exists a disadvantage as well in that the display of a moderate-size picture is not easily achievable. Therefore, it is desirable to attain adequate dimensional reductions.

These and other objects of this invention will become apparent from the following description and appended claims.

SUMMARY OF THE INVENTION

It is one object of this invention to provide a highly luminescent display cell which is adapted for dimensional reduction.

Another object of the invention is to provide a high-luminance display tube suited to be assembled and manufactured in a small-sized structure.

According to the present invention, there is provided a luminescent display tube having a single housing, which comprises a plurality of luminescent trios and a plurality of electrode units corresponding thereto, being disposed opposite to each other in a single housing, wherein each of the electrode units is provided with an enclosure.

Thus, the present invention realizes a high-luminance display cell in a small-sized structure which incorporates a plurality of luminescent trios serving as picture elements and electrode units corresponding thereto. Consequently, it is now possible to construct a large-picture display apparatus of moderate dimensions by arraying a multiplicity of such display cells.

In another feature, a plurality of wire cathodes and first grids as well as a common second grid are grouped into an electrode unit with its enclosure functioning as the second grid. Such electrode units are arrayed corresponding to individual phosphor trios, thereby facilitating the assembly and manufacture of a desired display cell.

In the electrode units constituting the display cell, each of the first grids is positioned and set merely by both an insulator substrate and a pair of insulator walls disposed in each unit without any other means, such as spot welding, so that the electrode unit can be assembled in a small structure, hence facilitating assembly and manufacture of a small-sized display cell.

BRIEF DESCRIPTION OF THE DRAWINGS

FIG. 30 is a top view showing a large screen display apparatus.

DETAILED DECRIPTION OF THE PREFERRED EMBODIMENT

In the present invention, a plurality of phosphor trios and a plurality of electrode units corresponding thereto are disposed opposite to each other in a single insulator housing. Each luminescent trio is composed of three phosphor layers to emit red, green and blue light and is formed at a desired position on the inner surface of a front panel of the insulator housing. The electrode unit consists of three electron beam sources corresponding to the individual color phosphor layers of the luminescent trio: i.e., a wire cathode, a first grid (control electrode) and a common second grid (accelerating electrode), in which the member forming the unit enclosure serves also as the second grid.

In the luminescent display cell of the construction, the electrode units are driven sequentially so that electron beams therefrom impinge upon the corresponding luminescent trios, which are thereby displayed sequentially with emission of light. By arraying a multiplicity of such display cells as individual display cells, each incorporating a plurality of picture elements composed of luminescent trios, it becomes possible to produce a large-screen picture display apparatus which is shaped into a sufficiently small structure. Furthermore, since the member forming the unit enclosure functions also as a second grid, the electrode unit is rendered remarkably compact to facilitate assembly and manufacture of such display cell.

In the electrode unit, the first grid is positioned and set by a combination of an insulator substrate and a pair of insulator walls without any other means, such as spot welding, whereby the electrode unit can be assembled in small dimensions.

Hereinafter the present invention will be described in detail with reference to an exemplary embodiment thereof shown in the accompanying drawings.

Figure 1:
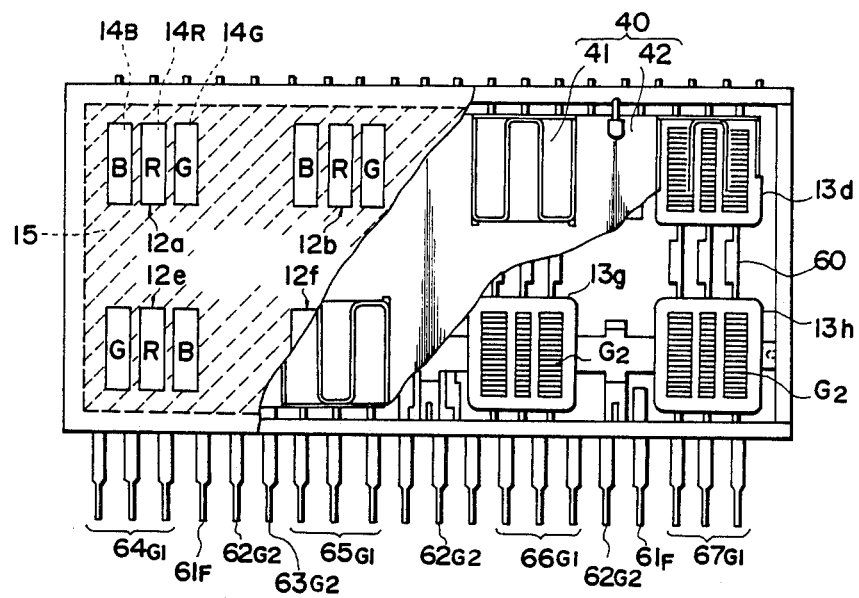
FIGS. 1 and 2 are partially cutaway top and side views of an exemplary luminescent cell embodying the present invention.
Figure 2:
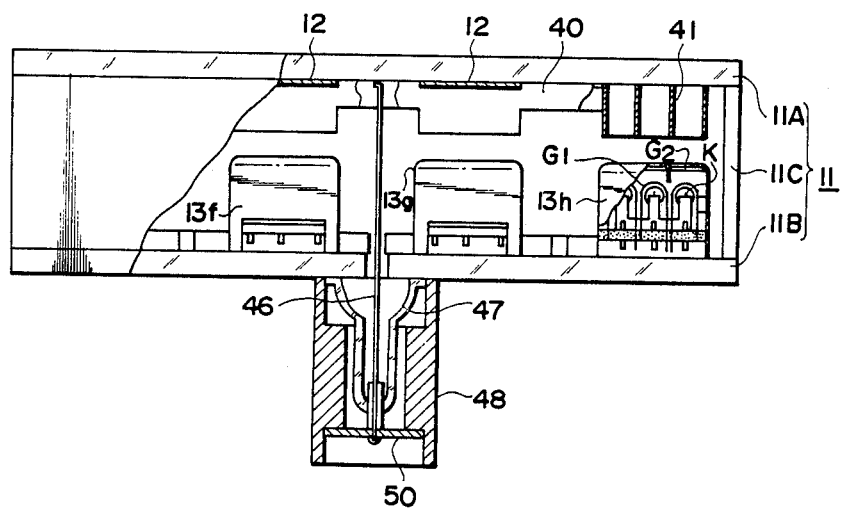
Figure 3:
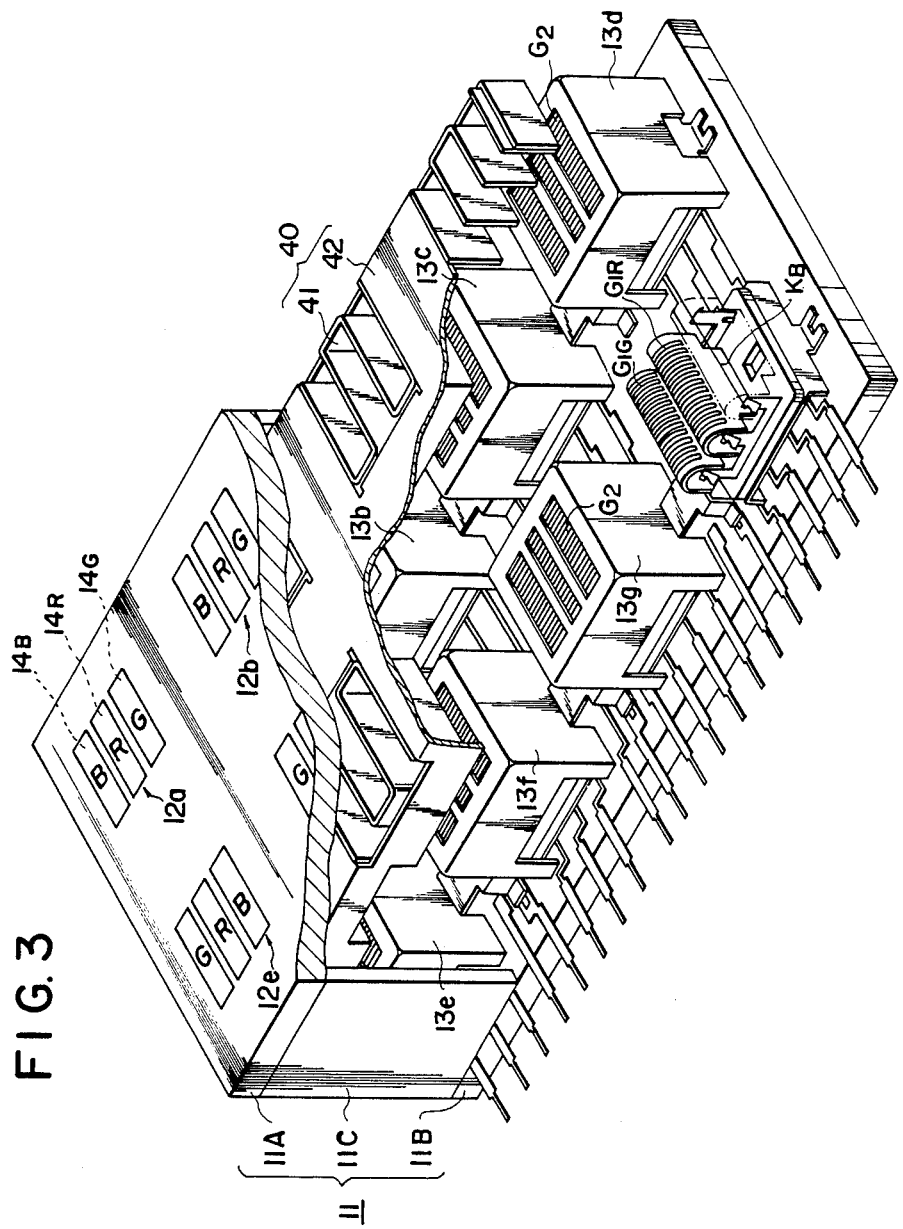
FIG. 3 is a partially cutaway perspective view of the embodiment shown in FIG. 1.

FIGS. 1, 2 and 3 are a front view, a side view and a perspective view, which are partially cutaway respectively, of a luminescent display tube of the present invention for use as a unitary cell.

In the figures, a glass housing 11 is composed of a front panel 11A, a rear back panel 11B and a sidewall plate 11C. The glass housing 11 is shaped to have dimensions of, for example, 41 mm high by 86 mm wide on the front panel 11A. In the glass housing 11 are arrayed eight luminescent trios 12 (12a, 12b, 12c, 12d, 12e, 12f, 12g, 12h) functioning as luminescent display components which are composed of phosphor layers to serve as picture elements, and eight electrode units 13 (13a, 13b, 13c, 13d, 13e, 13f, 13g, 13h) corresponding to the luminescent trios 12.

Figure 8:
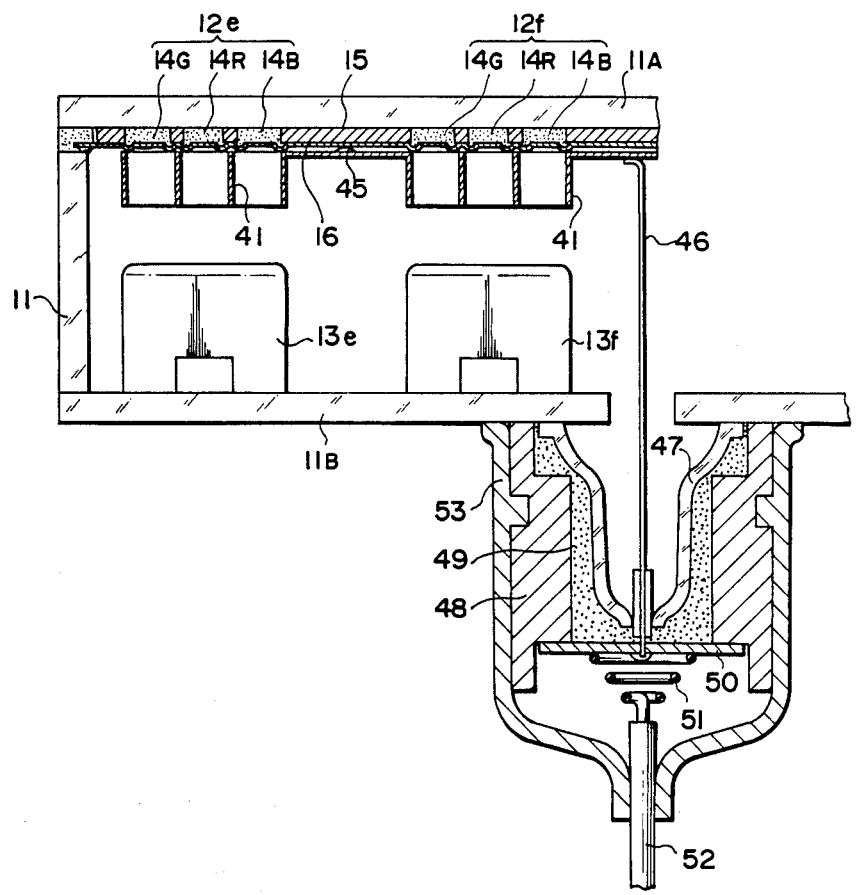
FIG. 8 is an enlarged sectional view of the principal components shown in FIG. 2.
Figure 10:
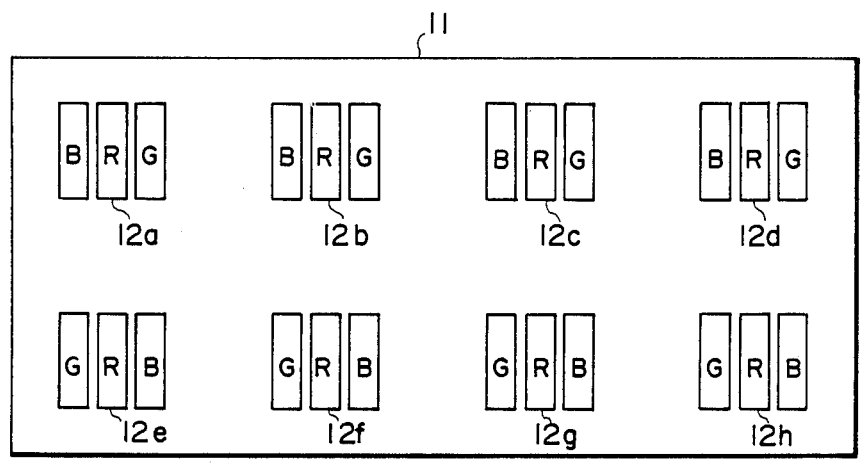
FIG. 10 is a top view showing an array of phosphor trios.

The eight luminescent trios 12 are formed by coating phosphor layers on the inner surface of the front panel 11A in such a manner that four trios are arrayed in each of upper and lower rows. In this example, each of the luminescent trios 12 is composed of three phosphor layers 14R, 14G and 14B, which emit red, green and blue light, respectively. In a configuration, as illustrated in FIG. 8, a conductive carbon layer 15 is printed in the shape of a frame on the inner surface of the front panel 11A, and the red phosphor layer 14R, green phosphor layer 14G and blue phosphor layer 14B are printed correspondingly to individual blank regions in the frame while being partially astride or overlapping the carbon layer 15. Further, a metal back layer 16 of aluminum or the like is deposited through a filming layer on the phosphor layers. In each of the luminescent trios 12, the red phosphor layer 14R is disposed at the center while the green phosphor layer 14G and the blue phosphor layer 14B are at the left and right ends, and vice versa. In such arrangement, however, the latter two layers 14G and 14B may be positionally reversed in every row with respect to the right and left ends, as illustrated in FIG. 10.

Electrode units 13 are disposed in the proximity of the rear panel 11B at positions opposite to the luminescent trios 12, respectively. In each of the electrode units 13, three wire cathodes K ($K_R$, $K_G$, $K_B$) are arrayed opposite to the red phosphor layer 14R, green phosphor layer 14G and blue phosphor layer 14B of the luminescent trio 12, respectively, and three first grids G1 ($G_{1R}$, $G_{1G}$, $G_{1B}$) are arrayed opposite to the three wire cathodes K, respectively, and further a common second grid G2 is disposed in relation to the three first grids $G_1$.

Figure 4:
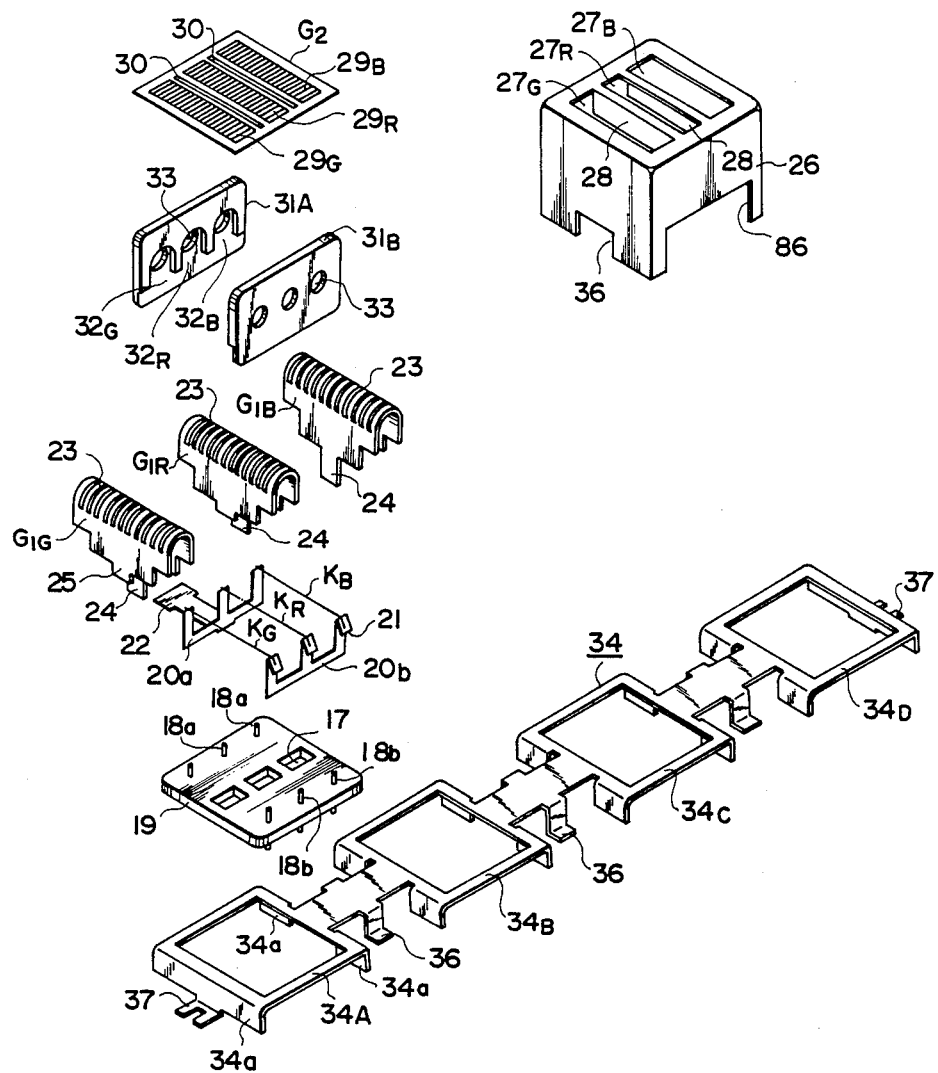
FIG. 4 is an exploded perspective view of an electrode unit.
Figure 5:
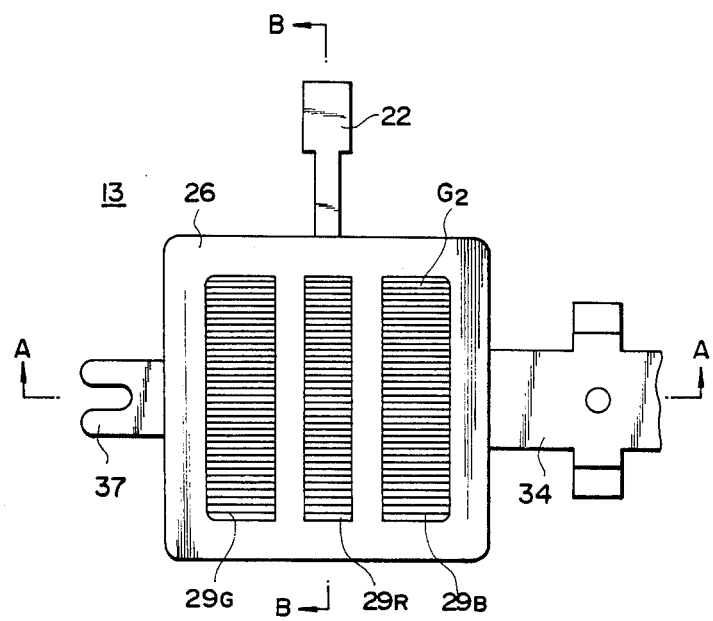
FIG. 5 is a top view of the electrode unit.
Figure 6:
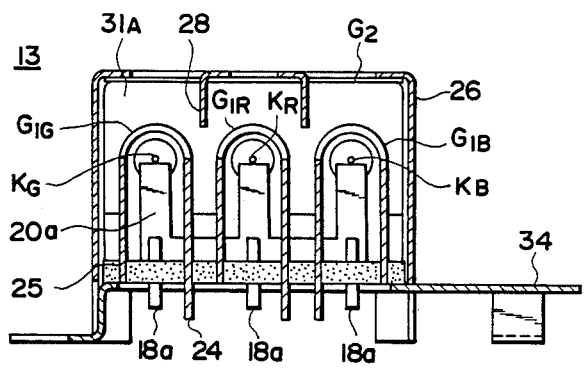
FIG. 6 is a sectional view taken along the line A—A in FIG. 5.
Figure 7:
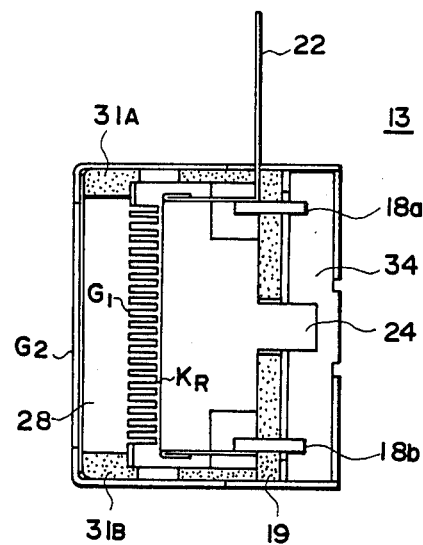
FIG. 7 is a sectional view taken along the line B—B in FIG. 5.

FIGS. 4 through 7 illustrate the detailed assembly and construction of the electrode unit 13, where three rectangular openings 17 are formed as shown in FIG. 4, and pairs of terminal pins 18a and 18b are infixed on an insulator substrate such as a ceramic base 19 at symmetrical positions with respect to the openings 17. A pair of E-shaped conductive support elements 20a and 20b are spot-welded to the terminal pins 18a and 18b, respectively, in such a manner that one support element 20a is welded in common to the three terminal pins 18a arrayed in one row, while another support element 20b is welded in common to the three terminal pins 18b in another row. And wire cathodes $K_G$, $K_R$ and $K_B$ are stretched between the conductive support elements 20a and 20b. One support element 20a serves to anchor one end of each wire cathode K, while another support element 20b is equipped with springs 21, each of which is bent at its fore end and anchors the other end of the wire cathode K, whereby any extension of the wire cathode K that may be caused due to temperature rise is absorbed by the springs 21 to prevent slack of the wire cathode K. A terminal 22 extends or is led out from the support element 20a. Each wire cathode K is produced by coating, for example, the surface of a tungsten heater with a carbonate which is an electron emitting material.

First grids $G_{1G}$, $G_{1R}$, and $G_{1B}$ are supported at the openings 17 in the ceramic base 19. These grids $G_{1G}$, $G_{1R}$, and $G_{1B}$ are so curved as to have cylindrical surfaces opposite the wire cathodes $K_G$, $K_R$, and $K_B$, and a multiplicity of slits 23 are formed on the cylindrical surfaces at predetermined positions in the longitudinal direction thereof. Furthermore, legs 24 and 25 substantially equal in width to the openings 17 extend from the two curved ends. The legs 24 and 25 are inserted into the openings 17 of the ceramic base 19 in such a manner as to narrow the space therebetween in the direction of mutual opposition, so that the two legs 24 and 25 are pressed against the inner walls of the openings 17 by the returning elasticity thereof exerted after insertion, thereby effecting temporary support. One leg 24 is shaped to be long for use as a terminal, while the other leg 25 is shaped to be short, so that when the two legs are inserted into the openings 17, the leg 24 extends therethrough while the other leg 25 is retained therein.

Each electrode unit is equipped with an enclosure 26, which is composed of a conductive material and forms a portion of the second grid $G_2$. The enclosure 26 has, in its front, three openings 27 ($27_G$, $27_R$, $27_B$) to be opposed to the first grids $G_1$ and incorporates separators 28 extending internally to partition or separate the openings 27 from one another. The enclosure 26 is produced by the technique of drawing and is finished by barrel polishing so as not to induce ready discharge. A common second grid $G_2$ inserted in the enclosure 26 has, in those portions opposite the first grids $G_1$ ($G_{1G}$, $G_{1R}$, $G_{1B}$), slit-like meshes $29_G$, $29_R$ and $29_B$ which correspond positionally to the slits 23 of the first grid $G_1$. The meshes $29_G$, $29_R$ and $29_B$ are mutually spaced apart by grooves or slots 30 into which the separators 28 are to be inserted. The second grid $G_2$ is disposed in the enclosure 26 in such a manner that the slit-like meshes $29_G$, $29_R$ and $29_B$ confront the openings $27_G$, $27_R$ and $27_B$, respectively, with the separators 28 inserted into the grooves or slots 30. The second grid $G_2$ is spot-welded to a portion of the enclosure 26 so as to be connected thereto, both mechanically and electrically, whereby the enclosure 26 is rendered capable of serving also as the second grid $G_2$.

A pair of insulating separators 31A and 31B are inserted into the enclosure 26 and are positioned along mutually opposed inner walls thereof. In the inner surface regions of the separators 31A and 31B, three grooves 32 ($32_G$, $32_R$, $32_B$) are formed to permit fitting of lateral end portions of the first grids $G_1$ therein. Denoted by 33 is a through-hole. When inserted into the enclosure 26, the separators 31A and 31B are retained in the gap formed between walls of the enclosure 26 and the aforesaid separators 28. And the upper ends of the separators 31A and 31B are kept in contact with the second grid $G_2$.

The ceramic base 19 with the wire cathodes K and the first grids $G_1$ attached thereto is inserted into the enclosure 26 where the second grid $G_2$ and the separators 31A and 31B are assembled, in such a manner that the bottom end faces of the separators 31A and 31B are kept in contact with the base 19. In this state, the respective two lateral ends of the first grids $G_{1G}$, $G_{1R}$ and $G_{1B}$ are fitted into the grooves $32_G$, $32_R$ and $32_B$ formed in the separators 31A and 31B. Consequently, when the legs 24 and 25 of the first grids $G_1$ are inserted into the openings 17 of the ceramic base 19, lateral end portions of the first grids $G_1$ are fitted into the grooves 32 of the separators 31A and 31B so as to be positioned exactly. A terminal 22, which is bent and extended from one support element 20a, where the wire cathodes K are stretched, is led out via a recess in the enclosure 26 by way of the space between the ceramic base 19 and the separator 31a. In a retainer assembly 34 composed of a conductive material, one frame-shaped retainer 34A is fitted in the enclosure 26, and a bent portion 34a of the retainer 34A is spot-welded to the enclosure 26 to hold the ceramic base 19, thereby constituting the electrode unit 13 shown in FIGS. 5 through 7.

As illustrated in FIG. 4, the conductive retainer assembly 34 consists of retainers 34A, 34B, 34C and 34D, which can be accommodated in the enclosure 26 of four electrode units and are connected integrally with one another by means of conductive connectors 35 so formed as to be fittable into recesses 36 of the enclosures 26. There are further shown attachment lugs 36 to be spot-welded to an unshown lead frame, and attachment lugs 37 to be secured to the glass housing 11. It follows, therefore, that the second grids $G_2$ of the four electrode units 13 are electrically connected with one another through the conductive retainer assembly 34.

Figure 9:
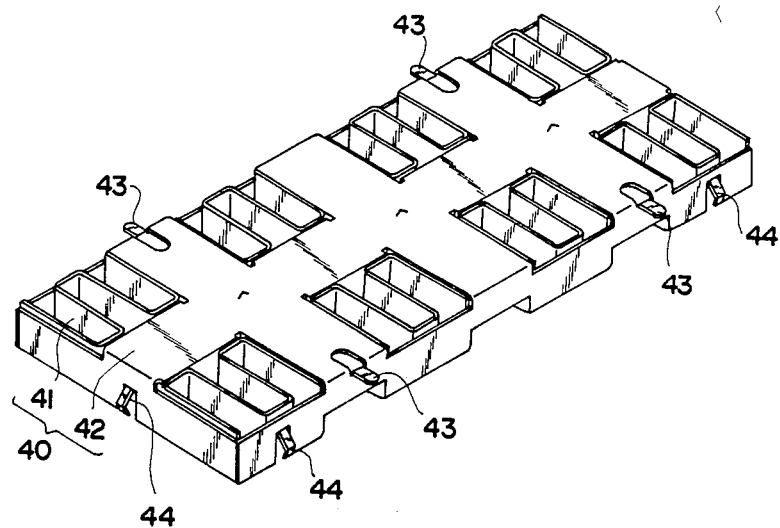
FIG. 9 is a perspective view of a separator assembly disposed in the proximity of an anode.

Meanwhile, a separator assembly 40 of a conductive material shown in FIG. 9 is so positioned as to surround the phosphor layers 14R, 14G and 14B of eight luminescent trios 12. The separator assembly 40 functions as a shield to prevent emission of light from the adjacent phosphor layers that may be caused by secondary electrons generated when primary electron beams from the wire cathodes K impinge upon the first grids $G_1$ and the second grids $G_2$. The separator assembly 40 also functions as a diffusion lens which diffuses the electron beams emitted from the wire cathodes K and thereby induces radiation of the beams to the whole area of the corresponding phosphor layers 14, while further serving as a power supply means to apply a high voltage of, e.g., 8 kV to each luminescent trio 12. In assembling, the separator assembly 40 is supported between the front panel 11A and the sidewall plate 11C of the glass housing 11 and is secured by the use of glass frit. The separator assembly 40 has separators 41, each shaped into three parts so that the phosphor layers of individual colors are surrounded in eight luminescent trios 12, and the separators 41 are connected integrally with one another through electrode plates 42. The separator assembly 40 is equipped with, at its upper ends, support fingers 43 projecting outward. Elastic bent elements 44 for positioning use are formed by cutting and raising lateral wall portions of the separator assembly 40. Accordingly, when the separator assembly 40 is inserted from above to the sidewall plate 11C in the glass housing 11, the support fingers 43 exactly butt against the upper end face of the sidewall plate 11C to support the separator assembly 40, and simultaneously the bent elements 44 butt against the inner face of the sidewall plate 11C to hold the separator assembly 40 at a predetermined position. Furthermore, a projection 45 (FIG. 8) is formed in a portion of the separator assembly 40 corresponding positionally to the electrode plate 42, and when the front panel 11A is superposed and sealed on the upper end face of the sidewall plate 11C after the separator assembly 40 is received in the sidewall plate 11C, the projection 45 contacts the metal back layer 16 or the carbon layer 15, whereby a high voltage obtained from an anode lead 46 (high-voltage terminal) is applied to the luminescent trios 12 in common. The anode lead 46 is connected, at one end, to the electrode plate 42 of the separator assembly 40, while the other end is led out via a tip-off tube 47 attached to the rear panel 11B of the glass housing 11. The anode lead 46 is composed of Dumet wire (copper alloy) wound with glass in its portion relative or adjacent to the tip-off tube 47. Consequently, an airtight condition is maintained between the anode lead 46 and the tip-off tube 47. A high voltage cover 48 is secured with an adhesive agent 49 to the exterior of the tip-off tube 47, and the anode lead 46 is soldered to an external terminal strip 50 attached to the high voltage cover 48. An external lead 52 is electrically connected to the terminal strip 50 via a spring 51, and the high voltage cover 48 is protected by a detachable cover 53 composed of silicone rubber or the like.

In the eight electrode units 13 (13a through 13h), each group of four units are set by a common retainer assembly 34 and then are disposed at predetermined positions on a lead frame 60, to which attachment lugs 36 of the retainer assembly 34 are spot-welded. Thereafter the terminal pins 18 of the wire cathodes K, the legs 24 of the first grids $G_1$ and the retainer assembly 34 of the electrode units 13a to 13d are connected to respective leads of the corresponding lead frames by means of lead wires (not shown). In this stage, as described before, the second grids $G_2$ of the four electrode units 13a to 13d arrayed in one horizontal row are connected with one another by the retainer assembly 34, and the second grids $G_2$ of the four electrode units 13e to 13h arrayed in another row are connected with one another similarly. Meanwhile, the first grids $G_1$ are mutually connected between every two electrode units arrayed in a vertical column, such as between 13a and 13e, between 13b and 13f, between 13c and 13g, and between 13d and 13h, respectively. That is, with respect to the two electrode units arrayed in a vertical column, the first grids $G_{1R}$ at the respective centers are mutually connected, and similarly the first grids $G_{1B}$ and $G_{1G}$ at the right ends are mutually connected, and further, the first grids $G_{1G}$ and $G_{1B}$ at the left ends are mutually connected. In this embodiment, the wire cathodes K are connected in series with one another.

The respective leads of the wire cathodes K, first grids $G_1$ and second grids $G_2$ are led out by way of a sealed region between the rear panel 11B and the bottom end face of the sidewall plate 11C.

There are further shown leads 61F of the wire cathodes; leads 62G2 of the second grids $G_2$ connected between the electrode units 13e to 13h; leads 63G2 of the second grids $G_2$ connected between the electrode units 13a to 13d; leads 64G1 of the three first grids $G_1$ mutually connected between the electrode units 13a and 13e; leads 65G1 of the three first grids $G_1$ mutually connected between the electrode units 13b and 13f; leads 66G1 of the three first grids $G_1$ mutually connected between the electrode units 13c and 13g; and leads 67G1 of the three first grids $G_1$ mutually connected between the electrode units 13d and 13h.

Figure 11:
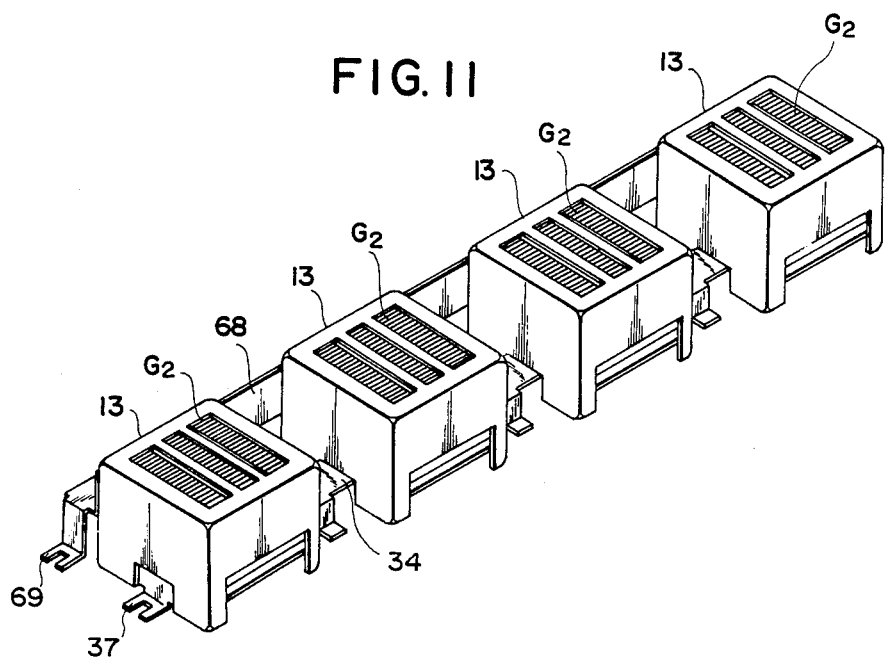
FIG. 11 is a perspective view of another example of electrode units connected with one another.
Figure 12:
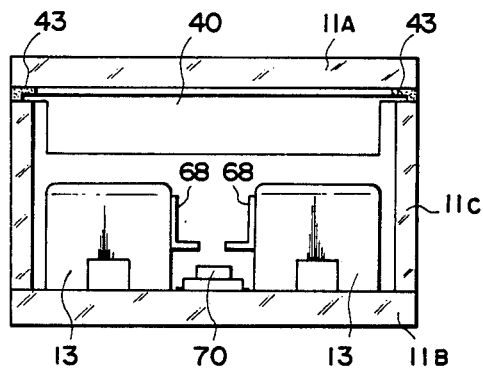
FIG. 12 is a sectional view of a region where a getter receptacle is disposed.

In a step of sealing the glass housing 11, the electrode units 13a to 13d and 13e to 13h held by the retainer assemblies 34 are secured in such a manner that the attachment lugs 37 at the ends of each retainer assembly 34 are sandwiched between the rear panel 11B and the sidewall plate 11C. In this stage, since the electrode units are secured only at the ends thereof, the four electrode units may deviate from predetermined positions by any bend or inclination of the retainer assembly 34 holding the electrode units. In order to prevent such a problem, as illustrated in FIG. 11, a common L-shaped auxiliary member 68 is provided on the lateral surfaces of the four electrode units integrally therewith, and the two ends of the auxiliary member 68 are also secured between the rear panel 11B and the sidewall plate 11C through attachment lugs 69. In this case, the auxiliary member 68 is of a conductive material. Due to the provision of such auxiliary member 68, any bend or inclination of the retainer assembly 34 can be eliminated and prevent positional deviation of the electrode units 13. Furthermore, as illustrated in FIG. 12, it becomes possible to limit scatter of getter particles from a getter receptacle 70 toward the luminescent screen. In addition, since the auxiliary member 68 is energized at the same potential as that of the second grid $G_2$, an advantage is obtained in suppressing generation of discharge. That is, the existence of the auxiliary member 68 checks the advance of the anode electric field toward the lower voltage side, thereby suppressing generation of discharge between the separator assembly 40, to which the anode voltage is applied, and the leads of the grids $G_1$, $G_2$ and cathodes K on the lower voltage side.

In the construction mentioned hereinabove, the following operation is performed. An anode voltage of, e.g., b 8 kV or so is applied via the anode leads 46 to the red, green and blue phosphor layers 14R, 14G and 14B of the luminescent trios 12. Simultaneously, a voltage of, e.g., 0 to 5 V is applied to each of the first grids $G_{1R}$, $G_{1G}$ and $G_{1B}$, while a voltage of, e.g., $-15$ to 50 V (row selection voltage) is applied to the second grid $G_2$.

In this arrangement where the anode voltage is kept constant, row selection is executed in response to the voltage applied to the second grid $G_2$, and selective on-off display is performed in response to the voltage applied to the first grids $G_1$. Suppose now that a voltage of 50 V is applied to the second grids $G_2$ of the electrode units 13a to 13d arrayed in an upper row, while a voltage of $-15$ V is applied as a cutoff voltage to the second grids $G_2$ of the electrode units 13e to 13h arrayed in a lower row. And if a voltage of 5 V is applied to the first grids $G_1$ via the leads 64G1 in the above state, the first luminescent trio 12a is selected, so that electron beams emitted from the wire cathodes K in the associated electrode unit are passed through the first grids $G_1$ and then are accelerated by the second grid $G_2$ to impinge upon the corresponding phosphor layers 14R, 14G and 14B, thereby displaying them with emission of light. The luminance is controlled by adjusting the pulse duration (application time) of the voltage (5 V) applied to the first grids $G_1$.

In case a voltage of 0 V is applied to the first grids $G_1$, the electron beams from the wire cathodes K are cut off so that the corresponding phosphor layers are not displayed with emission of light. In this manner, the upper-row luminescent trios 12a to 12d are displayed by the application of a voltage to the first grids $G_1$ sequentially via the leads 64G1, 65G1, 66G1 and 67G1, and after the second-grid voltage is changed to 50 V and applied to the lower-row second grids $G_2$, the lower-row luminescent trios 12e to 12h are displayed by the application of a voltage to the first grids $G_1$ sequentially via the leads 64G1 to 67G1.

The electron beams emitted from the wire cathodes K are diffused by the first grids $G_1$ and the separators 41 and then radiate the entire surfaces of the phosphor layers 14. When the electron beams from the wire cathodes K impinge upon the first grids $G_1$ and the second grid $G_2$, secondary electrons are generated therefrom. However, travel of such secondary electrons is checked by the separators 28 in the second-grid enclosure 26 and the anode-side separators 41, so that impingement thereof upon the adjacent phosphor layers is eliminated. Thus, by selectively controlling the voltages of the first grids $G_1$ and the second grid $G_2$, the luminescent trios 12 are displayed sequentially with high-luminance.

The above-described luminescent display cell 71 is incorporated in a unitary housing and a multiplicity of such unitary housings are arrayed in matrix arrangement to constitute a large-screen picture display apparatus.

In such a display cell 71, luminescent trios 12 serving as eight-picture elements are incorporated in a compact arrangement, so that the picture elements as a whole can be dimensionally reduced.

Furthermore, the three wire cathodes K, the first grids $G_1$ and the common second grid $G_2$ are assembled to construct an electrode unit where the unit enclosure 26 functions also as the second grid $G_2$, and the electrode unit 13 is positioned correspondingly to the luminescent trio 12, thereby facilitating assembly and manufacture of such display cell 71. The unit enclosure 26 functioning also as the second grid $G_2$ is produced by the technique of drawing, whereby its corner portion is rounded to increase the threshold voltage for discharge and eventually prevents any trouble that may otherwise be induced by discharge.

In the electrode unit 13, the first grids $G_1$ are positioned and supported by the openings 17 formed in the ceramic base 19 and also by the grooves 32 in the insulating separators 31A and 31B without any customary means of spot-welding or the like, so that the electrode unit 13 can be assembled in a sufficiently compact-sized structure.

When arraying a multiplicity of such display cells 71 in matrix arrangement to form a large-screen picture, luminescent trios 12 on the screen are disposed at equal intervals, both horizontally and vertically, so that nearly no space is left between the adjacent display cells 71. However, since the anode lead 46 in each display cell 71 is led out from the rear panel 11B of the glass housing 11 via the tip-off tube 47, the adjacent display cells 71 can be disposed in the proximity of each other.

Moreover, in the eight luminescent trios 12 on the screen where each red phosphor layer 14R is disposed at the center while green and blue phosphor layers 14G and 14B are disposed at the left and right ends, and vice versa. The latter two layers 14G and 14B may be positionally reversed in the upper and lower rows, whereby it is rendered possible to increase the apparent resolution.

It is to be understood that, although eight luminescent trios are employed in the above example, the number is not limited thereto and any adequate number is selectable.

Figure 14:
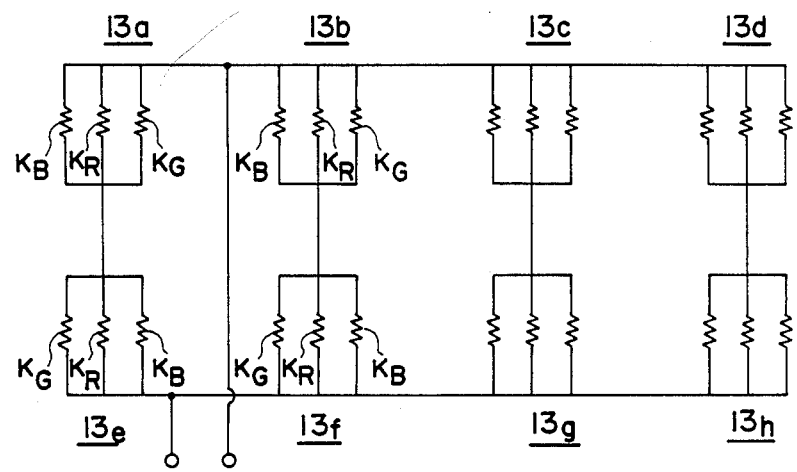
FIG. 14 is a diagram showing an exemplary method to connect cathodes.

In addition to the above example where the wire cathodes K in every four electrode units 13a to 13d, 13e to 13h are connected in parallel with one another, all of them in eight electrode units 13a to 13h, may be connected in parallel as shown in FIG. 14. In such configurations, if a breakage trouble or disconnection occurs in the wire cathode of any one electrode unit, the other electrode units are still working in the normal operating state.

The terminals of the electrode units and the lead frame may be connected directly without using any lead wire. Particularly with regard to the terminals of the wire cathodes K, the terminals 22 of the support elements 20a may be bent and extended for direct connection to the lead frame.

Figure 19:
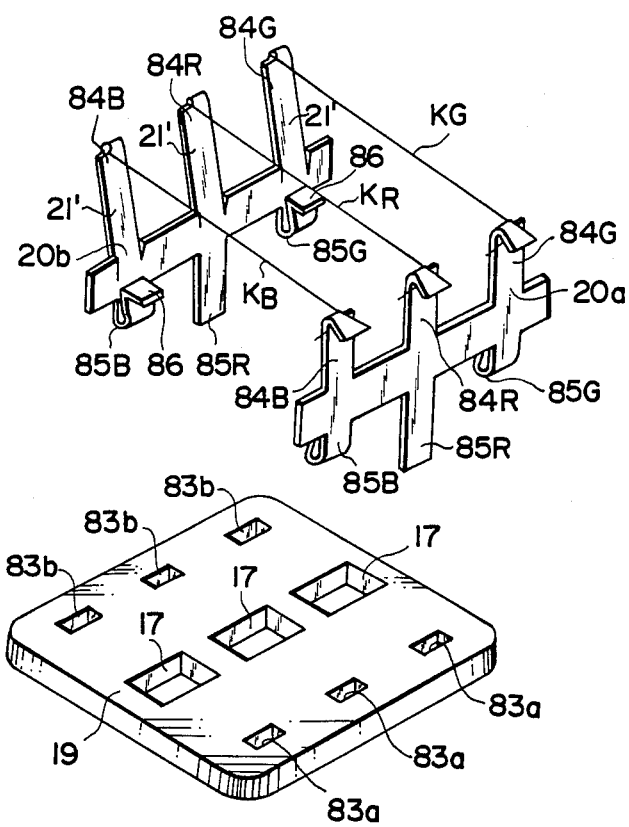
FIGS. 19 and 20 are an exploded view and a sectional view of an exemplary wire cathode support structure in the electrode unit.
Figure 20:
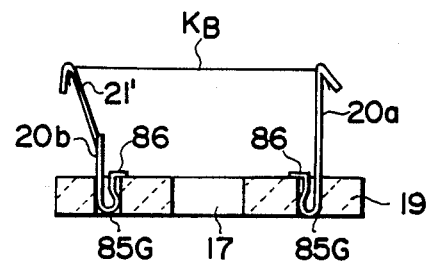

In the electrode unit 13 where the terminal pins 18a and 18b are infixed on the ceramic base 19, it is possible to omit the terminal pins 18a and 18b in a modified structure as illustrated in FIGS. 19 and 20. In such a modification, through-holes 83a and 83b are formed in the ceramic base 19 to hold a pair of conductive support elements 20a and 20b at positions symmetrical with respect to three openings 17 which retain the first grids $G_1$. In each of the conductive support elements 20a and 20b, support portions 84G, 84R and 84B for attachment of the wire cathodes are coupled to one another, and a rear or bottom end 85R of the center support portion forms a lead that extends downward, while rear or bottom ends 85G and 85B of the outer support portions 84G and 84B are folded back to have resilience. In this structure, the support portions 84G, 84R and 84B of one conductive support element 20a are formed to be stationary, while the support portions 84G, 84R and 84B of the other conductive support element 20b are partially cut at their base ends to form notches so as to function as springs 21'. The tab portions 86 cooperate with the ceramic base 19 to support the elements 20a and 20b in an upright position. The ends of the support portions 84G, 84R and 84B for stretching the wire cathodes KG, KR and KB, respectively, are bent and provided with notches for centering the wire cathodes K. The two support elements 20a and 20b are inserted into the through-holes 83a and 83b, respectively, and are anchored in the ceramic base 19 by the folded rear or bottom ends 85G and 85B on the two sides. The wire cathodes $K_G$, $K_R$ and $K_B$ are stretched between the support elements 20a and 20b. Each of the leads 85R extends through a center through-hole 83a and 83b and is thus led out through the ceramic base 19. In such arrangement, the terminal pins 18a and 18b are omitted so as to reduce the number of components required to construct each electrode unit 13.

Figure 13:
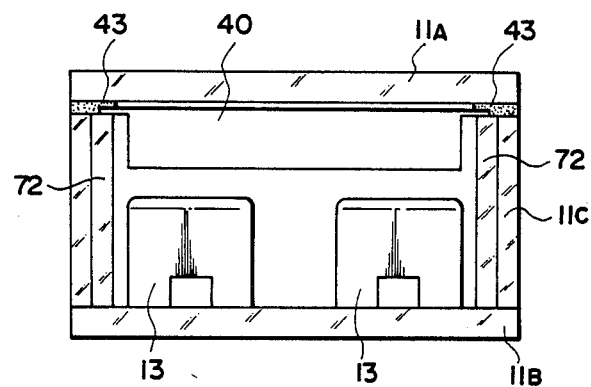
FIG. 13 is a sectional view of another exemplary embodiment of the invention.

In the foregoing embodiment shown in FIG. 12, anode-side separator assembly 40 is retained by positioning or sandwiching the support fingers 43 between the front panel 11A and the sidewall plate 11C of the glass housing 11. In this example, the length of each finger 43 is about half the thickness of the sidewall plate 11C. When it is necessary to increase the resistance against discharge between the fore end of the finger 43 and the outer surface of the glass housing 11, an additional glass plate 72 is provided along the inner surface of the sidewall plate 11C of the glass housing 11 as illustrated in FIG. 13. The finger 43 of the separator assembly 40 is held between the glass plate 72 and sidewall plate 11C and the front panel 11A.

Alternatively, the separator assembly 40 may be supported by omitting the support fingers 43, securing the separator assembly 40 directly to the front panel 11A of the glass housing 11 by the use of frit glass. Since the support fingers 43 have been eliminated in this modification, it is possible to reliably prevent external discharge induced outside of the glass housing as well as internal discharge induced inside of the glass housing along the inner surface of the sidewall plate 11C. In this modification, the region of the front panel 11A bonded with the frit glass must be free of the carbon layer 15 and the metal back layer 16. In the completed display apparatus, the frit-glass region is concealed since the front surface of the glass housing 11 is covered, except for the luminescent trios, with a frame member for shielding ambient light and so forth.

Figure 15:
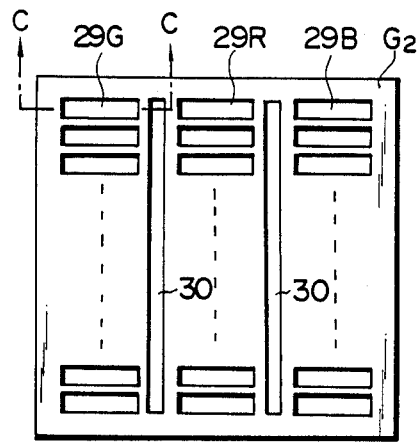
FIGS. 15 and 16 are a plan view of a second grid G2 for explanation of the invention and a sectional view taken along the line C—C in the plan view.
Figure 16:
Figure 17:
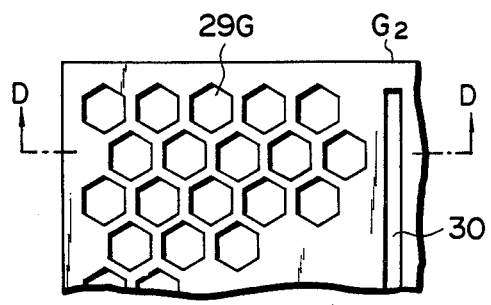
FIG. 17 is a top view of a principal portion of another exemplary second grid G2.
Figure 18:
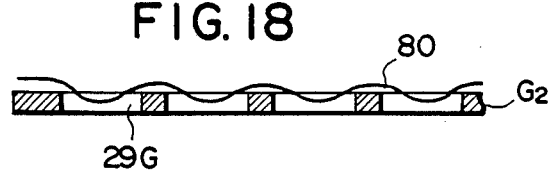
FIG. 18 is a sectional view taken along line D—D of FIG. 17.

Referring now to FIGS. 15 and 16, the meshes 29G, 29R and 29B are formed as slits in the second grid $G_2$, and the long dimension of each slit is large so that a high electric field 80 is prone to penetrate therethrough to form an electron lens. In comparison therewith, if the meshes 29G, 29R and 29B are shaped into tiny hexagons as shown in FIG. 17, penetration of a high electric field can be averted as shown in FIG. 18 to eliminate the possibility of forming an electron lens.

Figure 21:
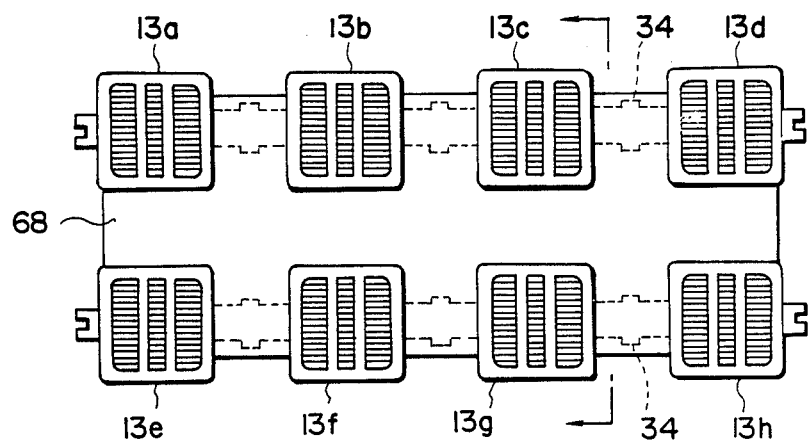
FIGS. 21 and 22 are a top view and a sectional view showing another exemplary structure for connection of electrode units.
Figure 22:
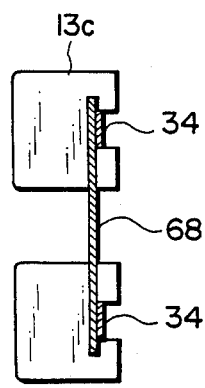
Figure 27:
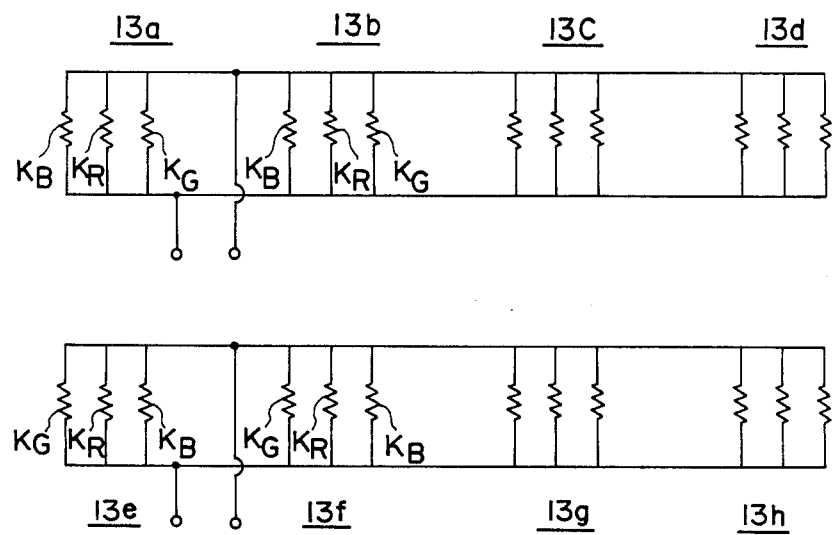
FIG. 27 is a diagram showing another exemplary method to connect cathodes.
Figure 28:
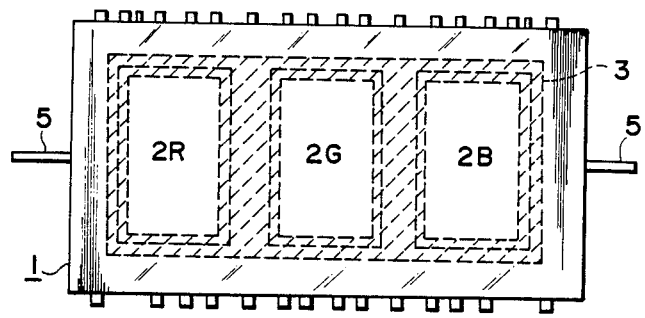
FIGS. 28 and 29 are a top view and a sectional view of a conventional display cell.
Figure 29:
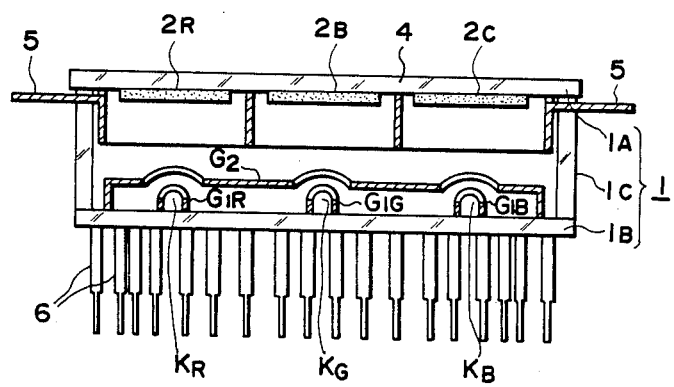

Furthermore, modifying the foregoing example where the row selection is executed by changing the voltage of the second grid $G_2$, such selection is achievable by switching the wire cathodes K as well. In such a case, as shown in FIG. 27, the wire cathodes K of the electrode units 13a to 13d are mutually connected, and similarly those of the electrode units 13e to 13h are mutually connected. In an operation where the mutually connected wire cathodes K in the upper row and the lower row are turned on, a drive voltage of, e.g., 0 to 5 V is applied as a row selection voltage to each wire cathode, while a drive voltage of 0 to 5 V is applied to the first grids $G_1$, and a fixed voltage lower than 10 V is applied in common to the second grids $G_2$ of the electrode units 13a to 13h. Suppose now that a voltage of 0 V is applied to the wire cathodes K of the upper-row electrode units 13a to 13d, while a cutoff voltage of 5 V is applied to the wire cathodes K of the lower-row electrode units 13e to 13h. In such a state, when a voltage of 5 V is applied to the first grids $G_1$ via the leads 64G1, the first luminescent trio 12a is displayed with emission of light. In the case of applying 0 V to the first grids $G_1$, the electron beams are cut off so that the corresponding phosphor layers are not displayed with emission of light. In this manner, the upper-row luminescent trios 12a to 12d are displayed by the application of a voltage to the first grids $G_1$ sequentially via the leads 64G1, 65G1, 66G1 and 67G1, and after the drive voltage for the wire cathodes K is changed to 0 V and applied to the lower-row wire cathodes K, the lower-row luminescent trios 12e to 12h are displayed by the application of 5 V to the first grids $G_1$ sequentially via the leads 64G1 to 67G1. In this arrangement, the second grids $G_2$. Of the electrode units 13a to 13h are mutually connected. For example, as shown in FIGS. 21 and 22, a common conductive auxiliary member 68 is spot-welded to the retainer assemblies 34 of the electrode units 13a to 13h. Or, although not shown, portions proximate to notches 86 formed in the electrode unit enclosures 26 are bent, and the auxiliary member 68 is spot-welded thereto with the second grids $G_2$ being mutually connected.

Figure 23:
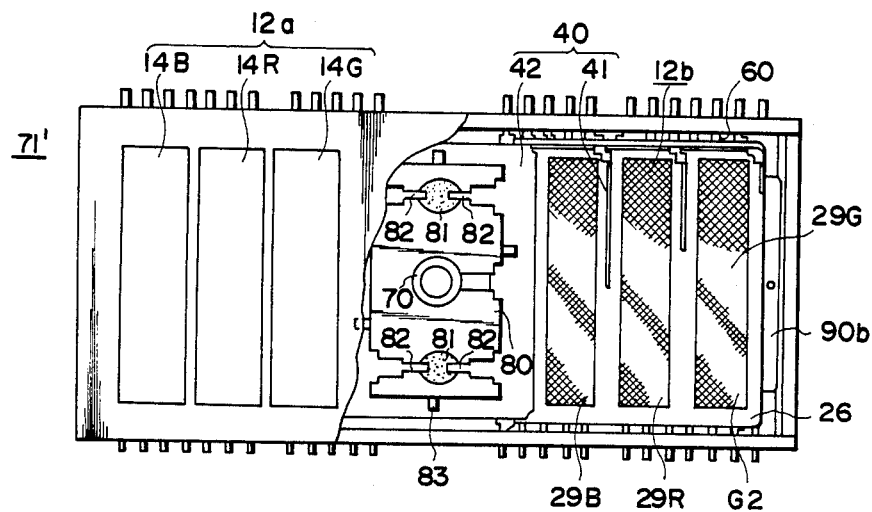
FIGS. 23 and 24 are partially cutaway top and side views of another exemplary luminescent display cell embodying the invention.
Figure 24:
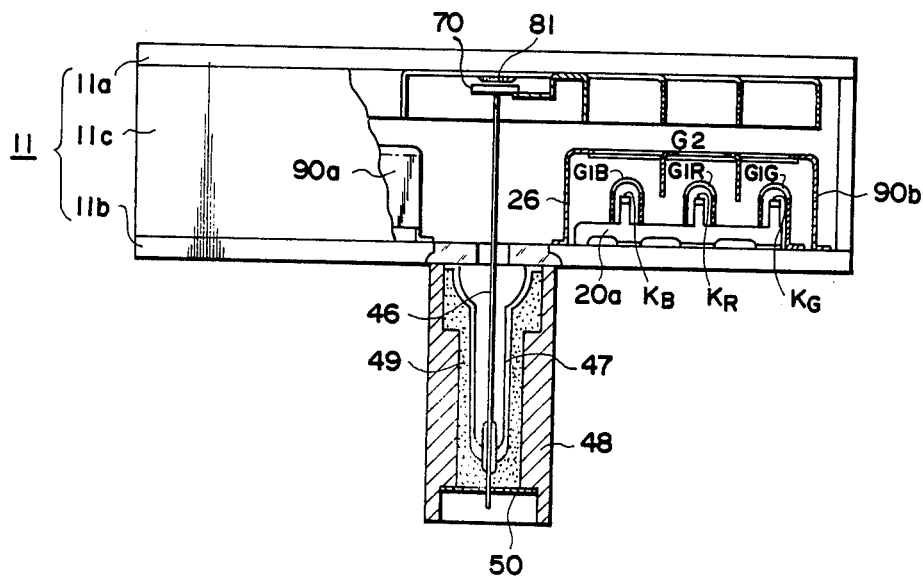

FIGS. 23 and 24 show another exemplary embodiment of the present invention including two luminescent trios.

In this example, two electrode units 90 (90a, 90b) are incorporated in a glass housing 11, which is shaped to have dimensions of, for example, 39 mm high by 86 mm wide on its front panel 11A. And two luminescent trios 12 (12a, 12b) are arrayed along the inner surface of the front panel 11A opposite to the electrode units 90. A separator assembly 40 of a conductive material is positioned on the screen in such a manner as to surround three-color phosphor layers 14R, 14G and 14B of the luminescent trios 12 as in the foregoing embodiment.

Each of the electrode units 90 employed in this example consists of a unit enclosure 26 to which a second grid $G_2$ having meshes 29B, 29R and 29G of tiny hexagons is spot-welded; three first grids $G_{1B}$, $G_{1R}$ and $G_{1G}$; and three wire cathodes $K_B$, $K_R$ and $K_G$ stretched between a pair of conductive support elements 20a and 20b. The unit enclosure 26 forming a portion of the second grid $G_2$, the first grids $G_1$ and the two support elements 20a and 20b are directly spot-welded to a lead frame 60 disposed on the inner surface of the rear panel 11b of the glass housing 11, so as to be connected both electrically and mechanically.

Figure 26:
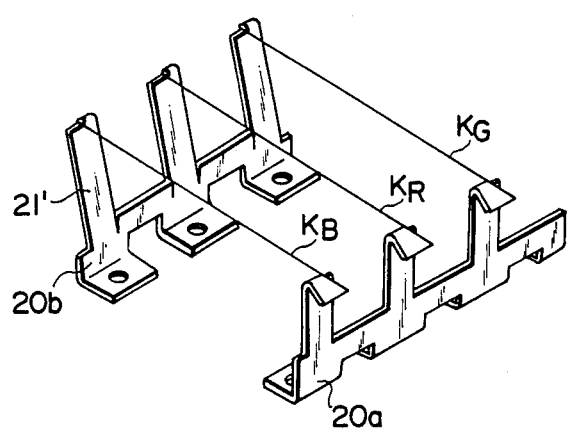
FIG. 26 is a perspective view of an exemplary wire cathode support element.

Referring now to FIG. 26, the E-shaped conductive elements 20 support the wire cathodes K, one element 20a is stationary, while the other element 20b has spring portions 21'. The ends of such support elements 20a and 20b for stretching the wire cathodes $K_B$, $K_R$ and $K_G$ are bent with notches formed for centering the wire cathodes K.

In the embodiment of FIGS. 23 and 24, a conductive getter receptacle 70 is supported electrically and mechanically in a portion of the separator assembly 40 positioned adjacent the front panel 11a, and an anode lead 46 is connected to the getter receptacle 70.

Figure 25:
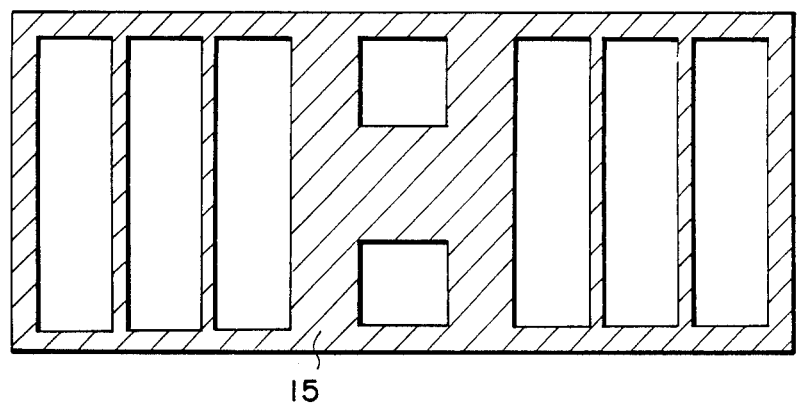
FIG. 25 is a top view showing a pattern of a carbon layer.

As for retention of the separator assembly 40, support fingers 43 are omitted and the separator assembly 40 is secured directly to the front panel 11a of the glass housing 11 by the use of frit glass 81 in such a manner that an opening 80 is formed in an electrode plate of the separator assembly 40, and protrusions 82 extending from the electrode plate toward the opening 80 are secured to the front panel 11a with frit glass 81. In this case, the region of the front panel 11a bonded with the frit glass 81 must be free of the carbon layer 15 and the metal back layer 16. For such purpose, the carbon layer 15 is shaped into a pattern of FIG. 25. A plurality of projections 83 formed by cutting and raising the periphery of the opening 80 in the separator assembly 40 are elastically folded back to be in contact with the metal back layer 16 and the carbon layer 15, so that electrical connection between the luminescent screen and the separator assembly 40 is effected by means of the projections 83. In the completed display apparatus, the frit-glass region is concealed since the front surface of the glass housing 11 is covered, except for the luminescent trios, with a frame member for shielding ambient light and so forth. In this example where the separator assembly 40 is directly secured to the front panel 11a of the glass housing 11, the support fingers 43 are eliminated so that, as mentioned previously, it is possible to prevent external discharge induced outside of the glass housing as well as internal discharge induced inside of the glass housing along the inner surface of the sidewall plate 11C. The techniques relative to such retention of the separator assembly 40 and such contact between the separator assembly 40 and the luminescent screen can be applied also to the foregoing example of FIGS. 1 and 2. And a large screen picture display apparatus is producible by arranging in matrix arrangement a multiplicity of display cells 71' shown in FIGS. 23 and 24. In arraying the display cells 71', the apparent resolution can be increased by reversing the positions of the green and blue phosphor layers 14G and 14B in every horizontal row in the same manner as mentioned before.

Although the invention has been described with respect to preferred embodiments, it is not to be so limited as changes and modifications can be made which are within the full intended scope of the invention as defined by the appended claims.

We claim as our invention:

1. A luminescent display tube having a single housing comprising a plurality of luminescent trios and a plurality of electrode units corresponding thereto, being disposed opposite to each other in said single housing wherein each of said electrode units includes an enclosure which is of a conductive material and functions as an accelerating electrode.

2. A luminescent display tube according to claim 1, wherein each of said electrode units comprises a plurality of wire cathodes and first grids, and a common insulator which supports said first grids.

3. A luminescent display tube having a single housing for forming a large picture screen when a multiplicity of said tubes is arrayed in matrix arrangement, each display tube comprising a plurality of luminescent trios serving as picture elements and a plurality of electrode units corresponding thereto being disposed opposite to each other in said single housing, said luminescent trios comprising three phosphors for emitting three different colors of light, and three electron beam sources, one for each of said phosphors disposed within said housing, said housing comprises an accelerating electrode for each of said electron beam sources, said housing includes a rear panel and further comprising an anode lead for supplying a high voltage to each of said luminescent trios, and said anode lead is led out from rear panel of said housing through a tip-off tube, whereby adjacent housings can be disposed adjacent each other when a multiplicity of said tubes is arrayed in maxtrix arrangement to form a large screen display.

4. A luminescent display cell comprising:
a glass envelope having a front panel, sidewall and rear plate;
a plurality of luminescent trios formed on the inner surface of said front panel;
a plurality of electrode units, each corresponding to a luminescent trio, disposed opposite said trio, spaced therefrom and positioned adjacent said rear plate;
each of said electrode units including:
a plurality of cathodes;
a plurality of first grids, each of said grid corresponding to a cathode;
an enclosure surrounding said cathodes and said first grid and functioning as an accelerating electrode and second grid.

5. A display cell as in claim 4, wherein each electrode unit includes a mounting insulator for supporting said wire cathodes and said first grid, and a pair of insulator members for positioning on opposite sides of said first grid and for engaging and positioning said first grid in said enclosure.

6. A display cell as in claim 1, wherein said enclosure includes a top surface defining a plurality of mesh-like second grid sections, one corresponding to each color of a luminescent trio and each mesh-like section having hexagonally-shaped openings.

7. A display cell as in claim 6, each electrode unit includes a mounting insulator for supporting said wire cathodes, said wire cathodes supported between a pair of conductors, each of said conductors being mounted to said insulator.

8. A display cell as in claim 7, wherein a plurality of pins are fixed to said insulator and each of said conductors is mounted to a plurality of pins.

9. A display cell as in claim 7, wherein said insulator includes a plurality of conductor mounting apertures and each of said conductors includes a biased mounting means receivable in said mounting aperture for securing a conductor to said insulator.

10. A display cell as in claim 7, wherein at least one of said conductor means is biased in a direction opposed to the other conductor so as to apply a stretching force to said cathodes.

* * * * *